(12) United States Patent
Morita

(10) Patent No.: US 10,124,796 B2
(45) Date of Patent: Nov. 13, 2018

(54) HYBRID VEHICLE SYSTEM

(71) Applicant: FUJI JUKOGYO KABUSHIKI KAISHA, Tokyo (JP)

(72) Inventor: Tomohiro Morita, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 15/454,095

(22) Filed: Mar. 9, 2017

(65) Prior Publication Data
US 2017/0282904 A1 Oct. 5, 2017

(30) Foreign Application Priority Data
Mar. 29, 2016 (JP) ................. 2016-066475

(51) Int. Cl.
*B60W 20/40* (2016.01)
*B60K 6/26* (2007.10)
(Continued)

(52) U.S. Cl.
CPC ............ *B60W 20/40* (2013.01); *B60K 6/26* (2013.01); *B60K 6/28* (2013.01); *B60K 6/387* (2013.01);
(Continued)

(58) Field of Classification Search
USPC .......................................................... 701/22
See application file for complete search history.

(56) References Cited

U.S. PATENT DOCUMENTS

2006/0137920 A1* 6/2006 Aoki ................ B60K 6/44
180/65.225
2008/0139360 A1* 6/2008 Hayashi ............ B60K 6/365
477/3
(Continued)

FOREIGN PATENT DOCUMENTS

JP 10-324177 A 12/1998
JP 2002-059752 A 2/2002
(Continued)

OTHER PUBLICATIONS

Office Action for JP Patent Application No. 2016-066475, dated Dec. 5, 2017, 05 pages of Office Action and 04 pages of English Translation.

*Primary Examiner* — Tyler D Paige
(74) *Attorney, Agent, or Firm* — Chip Law Group

(57) ABSTRACT

A hybrid vehicle system includes: an engine that is capable of outputting a torque to be transmitted to a driving wheel; a first motor generator that is provided in a coupled manner to the engine and that is capable of outputting a torque to be transmitted to the driving wheel; a transmission that converts a torque output from one or both of the engine and the first motor generator at a predetermined transmission gear ratio; a transmission clutch that is capable of switching on and off power transmission between the first motor generator and the transmission; a second motor generator that is capable of outputting a torque to be transmitted to the driving wheel in a state where the transmission clutch is disengaged; and an oil pump that is coupled to a motor shaft of the first motor generator and that is driven by rotation of the motor shaft.

19 Claims, 13 Drawing Sheets

(51) Int. Cl.

| | |
|---|---|
| *B60K 6/28* | (2007.10) |
| *B60K 6/387* | (2007.10) |
| *B60K 6/442* | (2007.10) |
| *B60K 6/543* | (2007.10) |
| *B60L 11/18* | (2006.01) |
| *B60W 10/02* | (2006.01) |
| *B60W 10/06* | (2006.01) |
| *B60W 10/08* | (2006.01) |

(52) U.S. Cl.
CPC .............. *B60K 6/442* (2013.01); *B60K 6/543* (2013.01); *B60L 11/1803* (2013.01); *B60L 11/1814* (2013.01); *B60L 11/1861* (2013.01); *B60W 10/02* (2013.01); *B60W 10/06* (2013.01); *B60W 10/08* (2013.01); *B60K 2006/268* (2013.01); *B60L 2210/30* (2013.01); *B60L 2210/42* (2013.01); *B60L 2240/423* (2013.01); *B60L 2240/50* (2013.01); *B60W 2510/0208* (2013.01); *B60W 2510/1025* (2013.01); *B60W 2710/021* (2013.01); *B60W 2710/0666* (2013.01); *B60W 2710/083* (2013.01); *Y10S 903/93* (2013.01)

(56) References Cited

U.S. PATENT DOCUMENTS

| | | | |
|---|---|---|---|
| 2011/0314960 A1* | 12/2011 | Yoshimura | B60K 6/365 74/650 |
| 2013/0017915 A1* | 1/2013 | Miyata | B60K 6/365 475/5 |
| 2013/0191012 A1 | 7/2013 | Hirotsu et al. | |
| 2014/0360793 A1* | 12/2014 | Aoki | B60K 6/445 180/65.23 |
| 2016/0069231 A1* | 3/2016 | Nishimine | B60L 11/00 701/22 |
| 2016/0176392 A1* | 6/2016 | Murata | B60K 6/445 701/22 |
| 2017/0219085 A1* | 8/2017 | Kiyokami | F16H 57/0413 |
| 2017/0282904 A1* | 10/2017 | Morita | B60K 6/26 |

FOREIGN PATENT DOCUMENTS

| | | |
|---|---|---|
| JP | 2003-294124 A | 10/2003 |
| JP | 2013-151175 A | 8/2013 |
| JP | 2014-180965 A | 9/2014 |
| JP | 2015-134508 A | 7/2015 |

* cited by examiner

FIG. 2

| | TRAVELING MODE | | | | |
|---|---|---|---|---|---|
| | ENGINE TRAVELING MODE | SINGLE MOTOR EV TRAVELING MODE | | TWIN MOTOR EV TRAVELING MODE | HYBRID TRAVELING MODE |
| ENGINE | DRIVING | STOP (DRIVING WHEN GENERATING ELECTRIC POWER) | | STOP | DRIVING |
| MG1 | ZERO TORQUE/ ELECTRIC POWER GENERATION/ REGENERATION | ZERO TORQUE/ ELECTRIC POWER GENERATION | POWER RUNNING/ REGENERATION | POWER RUNNING/ REGENERATION | ZERO TORQUE/ POWER RUNNING/ ELECTRIC POWER GENERATION/ REGENERATION |
| MG2 | ZERO TORQUE/ REGENERATION | POWER RUNNING/ REGENERATION | ZERO TORQUE/ REGENERATION | POWER RUNNING/ REGENERATION | ZERO TORQUE/ POWER RUNNING/ REGENERATION |
| ENGINE CLUTCH | ENGAGED | ENGAGED WHEN GENERATING ELECTRIC POWER | DISENGAGED | DISENGAGED | ENGAGED |
| FIRST TRANSMISSION CLUTCH | ENGAGED | DISENGAGED | ENGAGED | ENGAGED | ENGAGED |
| SECOND TRANSMISSION CLUTCH | ENGAGED | DISENGAGED | ENGAGED | ENGAGED | ENGAGED |

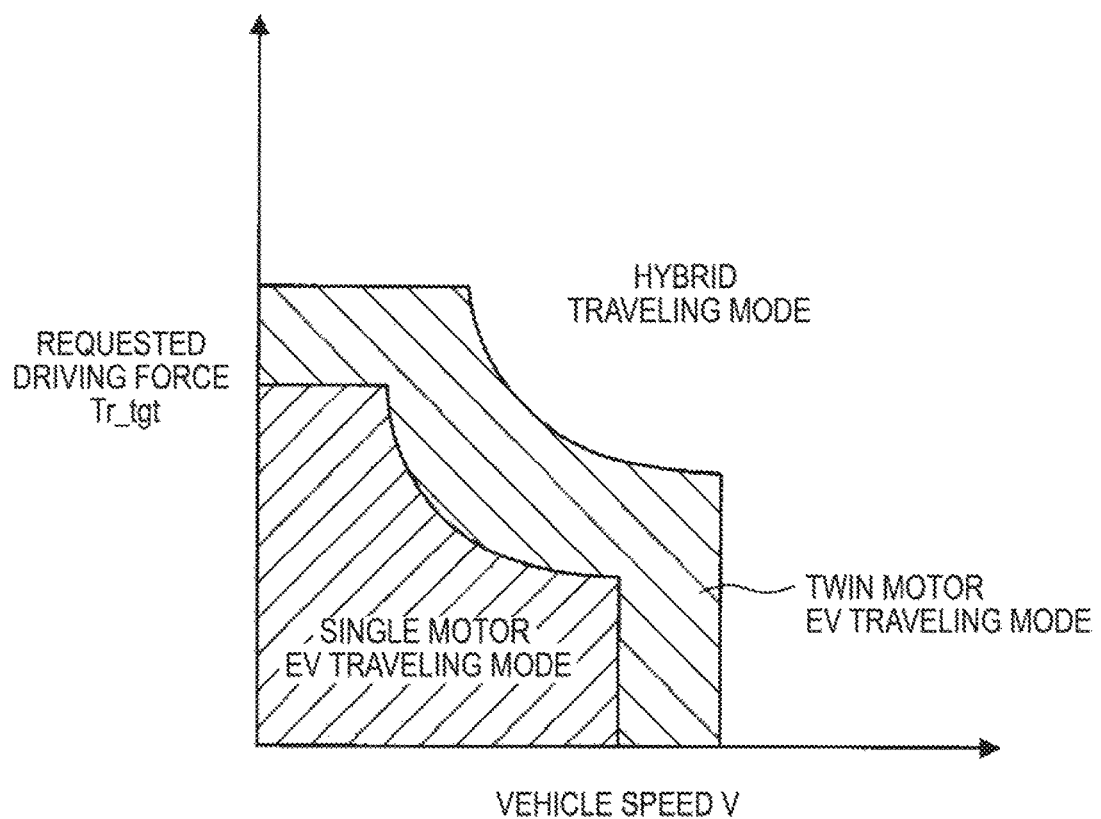

HYBRID VEHICLE SYSTEM

CROSS-REFERENCE TO RELATED APPLICATIONS

The present application claims priority from Japanese Patent Application No. 2016-066475 filed on Mar. 29, 2016, the entire contents of which are hereby incorporated by reference.

BACKGROUND

1. Technical Field

The present invention relates to hybrid vehicle systems.

2. Related Art

A hybrid vehicle equipped with an engine and driving motors is known as a vehicle driving source. Most of conventional vehicles each have a mechanical oil pump that is driven by an output torque from an engine and generates oil pressure to be supplied to a clutch, a transmission, and the like in an automatic transmission. Such a mechanical oil pump does not supply a working fluid to the automatic transmission in a state in which the engine is stopped, and the oil pressure does not increase. Accordingly, there is a hybrid vehicle having a system including an electric oil pump for securing oil pressure of the working fluid in the automatic transmission, in order to make it possible to start driving a vehicle by only a torque output from a driving motor in the state in which the engine is stopped.

For example, Japanese Unexamined Patent Application Publication (JP-A) No. H10-324177 and Japanese Unexamined Patent Application Publication (JP-A) No. 2014-180965 disclose a hybrid vehicle equipped with a first oil-hydraulic pump that generates oil pressure by using an output torque from an engine, and a second oil-hydraulic pump that is coupled to an electric motor for an oil pump that is controlled by a control device. In such a hybrid vehicle, the first oil-hydraulic pump is stopped but the second oil-hydraulic pump is still driven when the engine is stopped. Therefore, predetermined oil pressure is secured.

Japanese Unexamined Patent Application Publication (JP-A) No. 2003-294124 discloses a hybrid vehicle equipped with a first oil-hydraulic pump that is a mechanical oil-hydraulic pump to be driven while coupled to an input shaft of a transmission, and a second oil-hydraulic pump that is an electric oil-hydraulic pump to be driven by a motor that can be driven by an onboard battery for an auxiliary machine. In such a hybrid vehicle, the second oil-hydraulic pump is driven when oil pressure of the first oil-hydraulic pump (mechanical type) is not sufficient such as a case where a vehicle is stopped or a case where a vehicle is traveling at low speed. Thereby, predetermined oil pressure is secured.

However, the second oil-hydraulic pumps (electric type) equipped in the hybrid vehicles described in JP-A No. H10-324177, JP-A No. 2014-180965, and JP-A No. 2003-294124 are each a pump that is driven only when an engine is stopped, when a vehicle is stopped, or when a vehicle is traveling at low speed and oil pressure is not sufficient. In other words, the second oil-hydraulic pump (electric type) almost does not work during using the vehicle, and is not used effectively. To continuously generate the oil pressure, predetermined continuous rated output (for example, 4 to 5 kW) is necessary for a motor that drives the oil-hydraulic pump. However, it is inefficient to mount such a motor in a vehicle because the duration of use of such a motor is limited.

SUMMARY OF THE INVENTION

It is desirable to provide a novel and improved hybrid vehicle system in which a motor only for driving an oil pump is not included and it is possible to secure oil pressure in an automatic transmission even when an engine or a vehicle is stopped.

An aspect of the present invention provides a hybrid vehicle system including: an engine that is capable of outputting a torque to be transmitted to a driving wheel; a first motor generator that is provided in a coupled manner to the engine and that is capable of outputting a torque to be transmitted to the driving wheel; a transmission that converts a torque output from one or both of the engine and the first motor generator at a predetermined transmission gear ratio; a transmission clutch that is capable of switching on and off power transmission between the first motor generator and the transmission; a second motor generator that is capable of outputting a torque to be transmitted to the driving wheel in a state in which the transmission clutch is disengaged; and an oil pump that is coupled to a motor shaft of the first motor generator and that is driven by rotation of the motor shaft.

The hybrid vehicle system may further include an engine clutch that is capable of switching on and off power transmission between the engine and the first motor generator. The engine clutch may be provided in the first motor generator.

The second motor generator may be coupled to an input side of the transmission.

The second motor generator may be coupled to an output side of the transmission.

The hybrid vehicle system may further include an output side transmission clutch that is capable of switching on and off power transmission, between the transmission and the second motor generator.

The transmission clutch, the engine clutch, or the output side transmission clutch may be a clutch that is engaged when supplied oil pressure is increased.

The hybrid vehicle system may further include a second oil pump that is coupled to a crankshaft of the engine and that is driven by an output torque from the engine, while the oil pump is a first oil pump.

The hybrid vehicle system may include a control device that controls the hybrid vehicle system. The control device may be capable of executing a hybrid traveling mode in which the driving wheel is driven by an output torque from the engine and an output torque from at least one of the first motor generator and the second motor generator, and a motor traveling mode in which the driving wheel is driven by an output torque from at least one of the first motor generator and the second motor generator.

The control device may disengage the transmission clutch and drive the oil pump by an output torque from the first motor generator while executing a single motor electric vehicle traveling mode in which the driving wheel is driven by only a torque output from the second motor generator.

When starting the engine, the control device may crank the engine by using an output torque from the first motor generator in a state in which the transmission clutch is disengaged, and start the engine.

The control device may disengage an engine clutch that is capable of switching on and off power transmission between the engine and the first motor generator, while executing a twin motor electric vehicle traveling mode in which the driving wheel is driven by torques output from the first motor generator and the second motor generator.

BRIEF DESCRIPTION OF THE DRAWINGS

FIG. 2 is an explanatory diagram illustrating an example of a traveling mode of a hybrid vehicle system according to the implementation;

FIG. 3 is an explanatory diagram illustrating an example of a traveling mode switching map;

DETAILED DESCRIPTION

Figure 1:
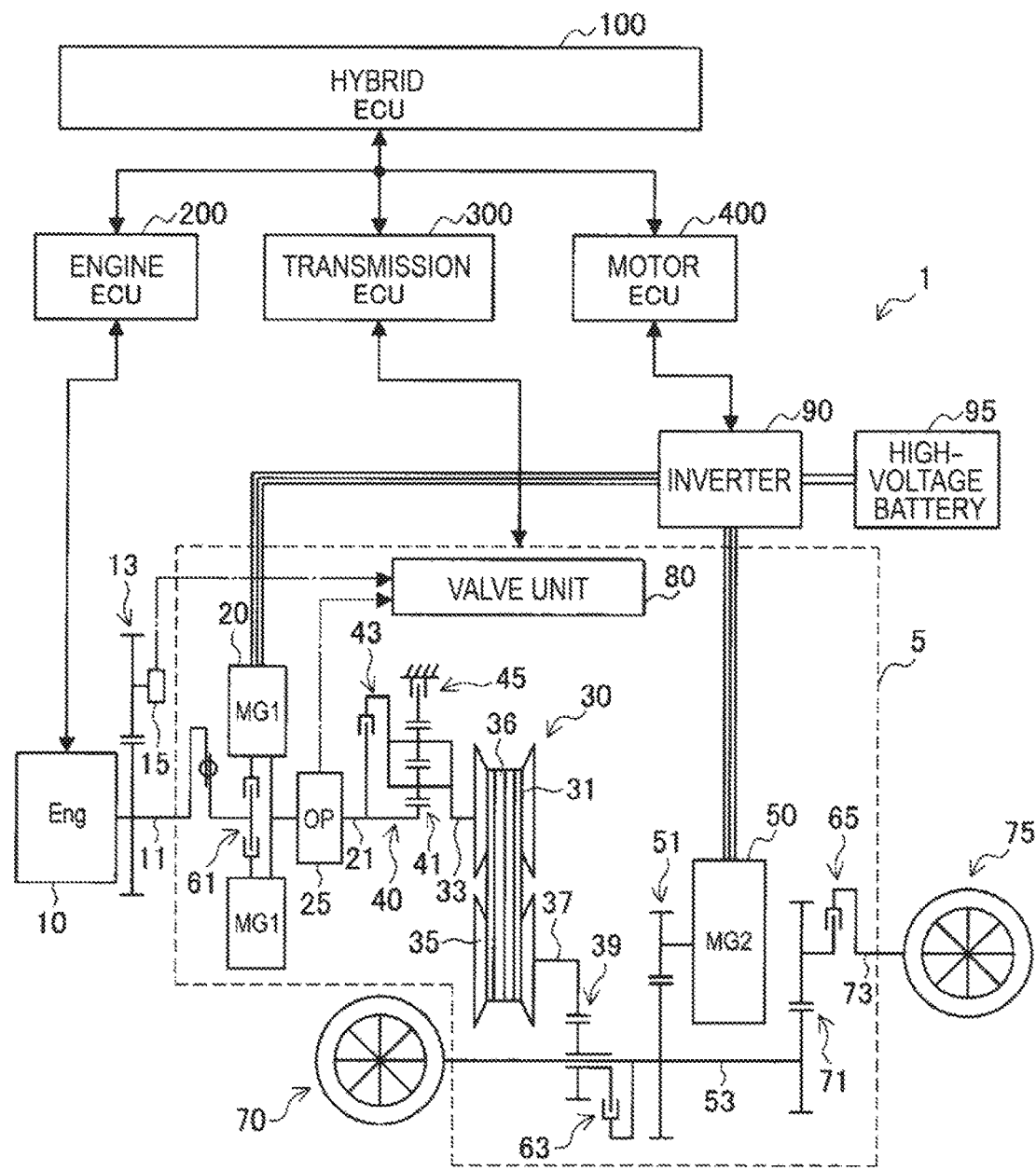
FIG. 1 is a schematic diagram illustrating a configuration example of a hybrid vehicle system according to an implementation of the present invention.

Hereinafter, preferred implementations of the present invention will be described in detail with reference to the appended drawings. Note that, in this specification and the appended drawings, structural elements that have substantially the same function and structure are denoted with the same reference numerals, and repeated description of these structural elements is omitted.

<1. Basic Configuration of Hybrid Vehicle System>

First, with reference to FIG. 1, a basic configuration of a hybrid vehicle system 1 according to an implementation of the present invention will be described.

FIG. 1 illustrates a configuration example of the hybrid vehicle system 1. The hybrid vehicle system 1 includes an engine 10, a first motor generator 20, and a second motor generator 50, and can use the engine 10, the first motor generator 20, and the second motor generation 50 in combination as a driving source. In the hybrid vehicle system 1, vehicle driving force is controlled while its traveling mode is switched among an engine traveling mode, a single motor electric vehicle (EV) traveling mode, a twin motor EV traveling mode, and a hybrid traveling mode.

In the hybrid vehicle system 1 according to the implementation, the engine traveling mode is a mode in which a vehicle is driven by a torque output from the engine 10. The single motor EV traveling mode is a mode in which a vehicle is driven by a torque output from the first motor generator 20 or the second motor generator 50. The twin motor EV traveling mode is a mode in which a vehicle is driven by torques output from the first motor generator 20 and the second motor generator 50. The hybrid traveling mode is a mode in which a vehicle is driven by a torque output from the engine 10 and a torque output from at least one of the first motor generator 20 and the second motor generator 50.

The engine 10 is an internal combustion engine that generates a torque by using gasoline or the like as fuel. The engine 10 includes a crankshaft 11 as an output shaft. The crankshaft 11 is extended in an automatic transmission 5. In addition, the crankshaft 11 is coupled to a mechanical oil pump 15 via a gear train 13. The mechanical oil pump 15 is driven by rotation of the crankshaft 11 of the engine 10, and supplies a working fluid to the automatic transmission 5. The working fluid supplied to the automatic transmission 5 is supplied to respective clutches and a continuously variable transmission (CVT) 30 serving as the automatic transmission via a valve unit 80.

The oil pump 15 may be coupled to a front wheel side output shaft 53, a rear wheel side output shaft 73, a primary shaft 33 or a secondary shaft 37 of the CVT 30 via a gear mechanism (not illustrated). In the case where the oil pump 15 is coupled to the front wheel side output shaft 53 or the rear wheel side output shaft 73, the oil pump 15 may also be driven by rotation of driving wheels 70 and 75. In the case where the oil pump 15 is coupled to the primary shaft 33 or the secondary shaft 37, the oil pump 15 may also be driven by rotation of the driving wheels 70 and 75 while a second transmission clutch 63 is engaged. In the hybrid vehicle system 1 according to the implementation, the oil pump 15 is coupled to the crankshaft 11 and the front wheel side output shaft 53, and driven by rotation of the crankshaft 11 or the front wheel side output shaft 53, whichever has higher rotation speed.

The automatic transmission 5 includes the first motor generator 20, the second motor generator 50, and the CVT 30, an engine clutch 61, a forward/reverse switching clutch 40 serving as a first transmission clutch, the second transmission clutch (output side transmission clutch) 63, and a transfer clutch 65. The valve unit 80 includes a plurality of control valves such as electromagnetic valves, and is controlled by a transmission control device (transmission ECU) 300. The transmission ECU 300 controls the plurality of control valves in response to operation request of the CVT 30 or each clutch. Thereby, flow rate of working fluids to be supplied to respective working parts is controlled, and oil pressure is adjusted.

The engine 10 and the first motor generator 20 are disposed via the engine clutch 61. The engine clutch 61 is disposed between the crankshaft 11 of the engine 10 and a motor shaft 21 of the first motor generator 21. The engine clutch 61 engages and disengages the crankshaft 11 and the motor shaft 21. In the state where the engine clutch 61 is engaged, it is possible to transmit power between the crankshaft 11 and the motor shaft 21. For example, the engine clutch 61 may be disengaged in the case where oil pressure is low, and engaged in the case where the oil pressure is increased. Hence, it is possible to reduce electric power used for increasing the oil pressure during the motor traveling mode.

In the hybrid vehicle system 1 according to the implementation, the engine clutch 61 is provided in the first motor generator 20. In other words, the first motor generator 20 is integrated with the engine clutch 61. This reduces the width of the automatic transmission 5 in a direction along the shaft direction of the crankshaft 11 or the motor shaft 21, and the space is conserved. For example, such a configuration can be obtained by making a space in the center of the first motor generator 30, which is inside of a rotor and a stator, and by disposing the engine clutch 61 in this space.

For example, the first motor generator 20 is a three-phase AC motor, and is coupled to a high-voltage battery 95 via an inverter 90. The first motor generator 20 has a function as a driving motor that is driven (power running driving) by electric power of the high-voltage battery 95 and generates vehicle driving force, a function as a generator that is driven by an output torque from the engine 10 and generates electric power, and a function as a generator that is driven in a regenerative manner when the vehicle speed slows down and that generates electric power by using kinetic energy of the driving wheels 70 and 75. In addition, the first motor generator 20 has a combination of a function as a starter motor that starts and stops the engine 10, and a function as a driving motor that rotates and drives the oil pump 25 coupled to the motor shaft 21.

In the case where the first motor generator 20 functions as the starter motor, the driving motor, or the driving motor of the oil pump 25, the inverter 90 drives the first motor generator 20 by converting DC power supplied from the high-voltage battery 95 into AC power. In the case where the first motor generator 20 functions as the generator, the inverter 90 charges the high-voltage battery 95 by converting AC power generated in the first motor generator 20 into DC power.

As described above, in the hybrid vehicle system 1 according to the implementation, power is transmitted between the crankshaft 11 and the motor shaft 21, not via a torque converter but the engine clutch 61. Therefore, when the first motor generator 20 and the engine 10 are completely separated in a time period in which the engine 10 outputs no torque, the engine 10 does not consume an output torque from the first motor generator 20. Accordingly, it is possible to suppress decrease in job efficiency of the first motor generator 20 in the case where the first motor generator 20 outputs a torque or the first motor generator 20 is driven in a regenerative manner.

A gear oil pump 25 is built on the motor shaft 21 of the first motor generator 20. The oil pump 25 is driven by rotation of the motor shaft 21 that is rotated by revolution of the engine 10 or rotation of the first motor generator 20, and supplies a working fluid to the valve unit 80. Such an oil pump 25 is configured as an electric oil pump to be driven by the first motor generator 20. Therefore, even in a state where the engine 10 is stopped, the oil pump 25 can be driven by an output torque from the first motor generator 20 and it is possible to supply oil pressure to the valve unit 80.

The motor shaft 21 of the first motor generator 20 is coupled to the primary shaft 33 of the CVT 30 via the forward/reverse switching clutch 40. The forward/reverse switching clutch 40 includes a planetary gear 41, a forward clutch 43, and a reverse brake 45. By controlling the forward clutch 43 and the reverse brake 45, it is possible to switch rotation directions of the primary shaft 33. When the reverse brake 45 is disengaged and the forward clutch 43 is engaged, the motor shaft 21 of the first motor generator 20 is directly coupled to the primary shaft 33. Thereby, an output torque from the engine 10 or the first motor generator 20 is transmitted to the primary shaft 33 via the forward clutch 43, the primary shaft 33 rotates in a normal rotation direction, and the vehicle can travel in a forward direction.

When the forward clutch 43 is disengaged and the reverse brake 45 is engaged, the motor shaft 21 is coupled to the primary shaft 33 via the planetary gear 41. Thereby, an output torque from the engine 10 or the first motor generator 20 is transmitted to the primary shaft 33 via the planetary gear 41, the primary shaft 33 rotates in a reverse rotation direction, and the vehicle can travel in a backward direction. When both the forward clutch 43 and the reverse brake 45 are disengaged, the forward/reverse switching clutch 40 enters a neutral state in which power from the engine 10 or the first motor generator 20 is not transmitted to the primary shaft 33. The forward/reverse switching clutch 40 in the hybrid vehicle system 1 according to the implementation corresponds to the first transmission clutch that switches on and off power transmission between the motor shaft 21 and the primary shaft 33. The forward clutch 43 and the reverse brake 45 may be disengaged in the case where oil pressure is low, and engaged in the case where the oil pressure is increased. Hence, it is possible to reduce electric power used for increasing the oil pressure during the motor traveling mode.

The CVT 30 includes the primary shaft 33 and the secondary shaft 37 disposed parallel to the primary shaft 33. A primary pulley 31 is fixed to the primary shaft 33, and a secondary pulley 35 is fixed to the secondary shaft 37. The primary pulley 31 and the secondary pulley 35 are wound by a winding-type power transmission member 36 made of a belt or a chain. The CVT 30 changes a pulley ratio by changing a winding radius of the power transmission member 36 on the primary pulley 31 and the secondary pulley 35, and transmits a torque converted at a transmission gear ratio according to a vehicle traveling state between the primary shaft 33 and the secondary shaft 33.

The secondary shaft 37 is coupled to the front wheel side output shaft 53 via a gear train 39 and the second transmission clutch 63. The second transmission clutch 63 corresponds to the output side transmission clutch. The front wheel side output shaft 53 is coupled to the front wheel (driving wheel) 70 via a speed reduction gear and a driving shaft (that are not illustrated). Driving force output via the front wheel side output shaft 53 can be transmitted to the driving wheels 70 and 75.

The second motor generator 50 is coupled to the front wheel side output shaft 53 via a gear train 51. The second motor generator 50 is provided in a coupled manner to the engine 10 via the engine clutch 61, the forward/reverse switching clutch 40, and the second transmission clutch 63. In a way similar to the first motor generator 20, the second motor generator 50 is a three-phase AC motor, and is coupled to the high-voltage battery 95 via the inverter 90. The second motor generator 50 has a function as a driving motor that is driven (power running driving) by electric power of the high-voltage battery 95 and generates vehicle driving force, and a function as a generator that is driven in a regenerative manner when the vehicle speed slows down and that generates electric power by using kinetic energy of the driving wheels 70 and 75.

In the case where the second motor generator 50 functions as the driving motor, the inverter 90 drives the second motor generator 50 by converting DC power supplied from the high-voltage battery 95 into AC power. In the case where the second motor generator 50 functions as the generator, the inverter 90 charges the high-voltage battery 95 by converting AC power generated in the second motor generator 50 into DC power. A rated output of the second motor generator 50 and a rated output of the first motor generator 20 may be the same or may be different from each other.

The second transmission clutch 63 is engages or disengages the secondary shaft 37 and the front wheel side output shaft 53. In the state where the second transmission clutch 63 is engaged, it is possible to transmit power between the secondary shaft 37 and the front wheel side output shaft 53. On the other hand, in the state where the second transmission clutch 63 is disengaged, the CVT 30 and the front wheel side output shaft 53 are separated. In other words, in the state where the second transmission clutch 63 is disengaged, not only the engine 10 and the first motor generator 20 but also the CVT 30 are separated from the front wheel side output shaft 53. Accordingly, while the second motor generator 50 is controlling driving, necessary oil pressure decreases in the automatic transmission 5, and this results in good fuel economy. For example, the second transmission clutch 63 may be disengaged in the case where oil pressure is low, and engaged in the case where the oil pressure is increased. Hence, it is possible to reduce electric power used for increasing the oil pressure during the motor traveling mode.

The front wheel side output shaft 53 is coupled to the rear wheel side output shaft 73 via a gear train 71 and the transfer clutch 65. The rear wheel side output shaft 73 is coupled to the driving wheel 75 via a propeller shaft, a speed reduction gear and a driving shaft (that are not illustrated). A torque output via the rear wheel side output shaft 73 can be transmitted to the driving wheel 75. The transfer clutch 65 switches on and off torque transmission to the rear wheel side output shaft 73. In the state where the transfer clutch 65 is engaged, driving force is transmitted to the rear wheel side output shaft 73, and the hybrid vehicle enters a four wheel driving mode. In the state where the transfer clutch 65 is engaged, driving force is transmitted to the rear wheel side output shaft 53 alone, and the hybrid vehicle enters a front wheel driving mode.

<2. Configuration Example of Electronic Control System>

Next, a configuration example of an electronic control system of the hybrid vehicle system 1 illustrated in FIG. 1 will be described.

In the hybrid vehicle system 1, the engine 10 is controlled by an engine control unit (engine ECU) 200. The automatic transmission 5 is controlled by a transmission control unit (transmission ECU) 300. The first motor generator 20 and the second motor generator 50 are controlled by a motor control unit (motor ECU) 400. The engine ECU 200, transmission ECU 300, and the motor ECU 400 are coupled to a hybrid control unit (hybrid ECU) 100 that integrally controls the entire system. The hybrid ECU 100 outputs control commands to the engine ECU 200, the transmission ECU 300, and the motor ECU 400 to control traveling of the vehicle or to control charging of the high-voltage battery 95.

Each of the ECUs includes a microcontroller, various kinds of interface or peripheral equipment and the like. The respective ECUs are coupled via a communication line such as the Controller Area Network (CAN) to establish a two-way communication. The respective ECUs communicate control information or various kinds of information on control targets to each other. Next, overview of functions of the respective ECUs will be described.

The engine ECU 200 receives a control command from the hybrid ECU 100, and calculates controlled variables such as a throttle opening degree, ignition timing, and fuel injection quantity, on the basis of information detected by various sensors of the engine 10. The engine ECU 200 drives a throttle valve, an ignition plug, and a fuel injection valve, and the like on the basis of the calculated controlled variables, and controls the engine 10 in a manner that output of the engine 10 becomes a control command value.

The motor ECU 400 receives a control command from the hybrid ECU 100, and independently controls the first motor generator 20 or the second motor generator 50 via the inverter 90. The motor ECU 400 outputs a current command or a voltage command to the inverter 90 on the basis of information on a rotation speed, voltage, current, and the like of the first motor generator 20 or the second motor generator 50, and independently controls the first motor generator 20 or the second motor generator 50 in a manner that output of the first motor generator 20 or the second motor generator 50 becomes a control command value.

The transmission ECU 300 receives a control command from the hybrid ECU 100, decides a transmission gear ratio of the CVT 30, and performs control that converts an input torque at an appropriate transmission gear ratio according to a traveling state. For example, the transmission ECU 300 controls the transmission gear ratio of the CVT 30 by controlling pressure in oil-hydraulic chambers (not illustrated) provided in the primary pulley 31 and the secondary pulley 35, adjusting positions of movable sheaves, and adjusting sheave width. The transmission ECU 300 receives a control command from the hybrid ECU 100, controls engagement and disengagement of the engine clutch 61, the forward/reverse switching clutch 40, and the second transmission clutch 63, and switches the traveling mode. The transmission ECU 300 controls engagement and disengagement of the respective clutches by controlling oil pressure to be supplied to the respective clutches, for example.

In the hybrid vehicle system 1 according to the implementation, the transmission ECU 300 adjusts oil pressure to be supplied to the CVT 30 or the respective clutches by controlling control valves including in the valve unit 80. The valve unit 80 does not have to include all the control valves for adjusting the oil pressure to be supplied to the CVT 30 and the respective clutches. For example, the respective control valves may be provided in oil passages of working fluids to be distributed from a gallery chamber to the respective working parts.

<3. Traveling Mode>

Next, travel modes executed in the hybrid vehicle system 1 according to the implementation will be described. FIG. 2 illustrates an example of traveling modes of the hybrid vehicle system 1 according to the implementation. FIG. 3 illustrates an example of a traveling mode selecting map. Hereinafter, the forward/reverse switching clutch 40 is referred to as the first transmission clutch. In addition, hereinafter, an example in the case where the vehicle is controlled in a four wheel driving mode in which the transfer clutch 65 is engaged will be described. In the case of the front wheel driving mode, driving force or regenerative braking force is not transmitted to the rear wheel 75.

As illustrated in FIG. 3, the hybrid vehicle system 1 according to the implementation selects the single motor EV traveling mode in the case where horse power (vehicle speed V×requested driving force Tr_tgt) necessary for vehicle traveling is small. As the necessary horsepower increases, the traveling mode is sequentially switched to the twin motor EV traveling mode, and the hybrid traveling mode. However, the map in FIG. 3 is a mere example. Regions in which the respective traveling modes may be selected in the map may be set appropriately.

In the hybrid vehicle system 1, the engine traveling mode is selected only in the case where power running control cannot be performed on the first motor generator 20 and the second motor generator 50, so as to suppress consumption of fuel to be used for driving the engine 10.

(3-1. Engine Traveling Mode)

As illustrated in FIG. 2, the engine ECU 200 drives the engine 10 in the engine traveling mode. The transmission ECU 300 engages all the engine clutch 61, the first transmission clutch 40, and the second transmission clutch 63, and transmits an output torque from the engine 10 to the CVT 30. The oil pump 15 is driven by the engine 10 that is driving, and oil pressure may be secured in the automatic transmission 5. Subsequently, the transmission ECU 300 converts the torque output from the engine 10 at a predetermined transmission gear ratio in the CVT 30, and transmits the torque to the front wheel side output shaft 53.

Figure 4:
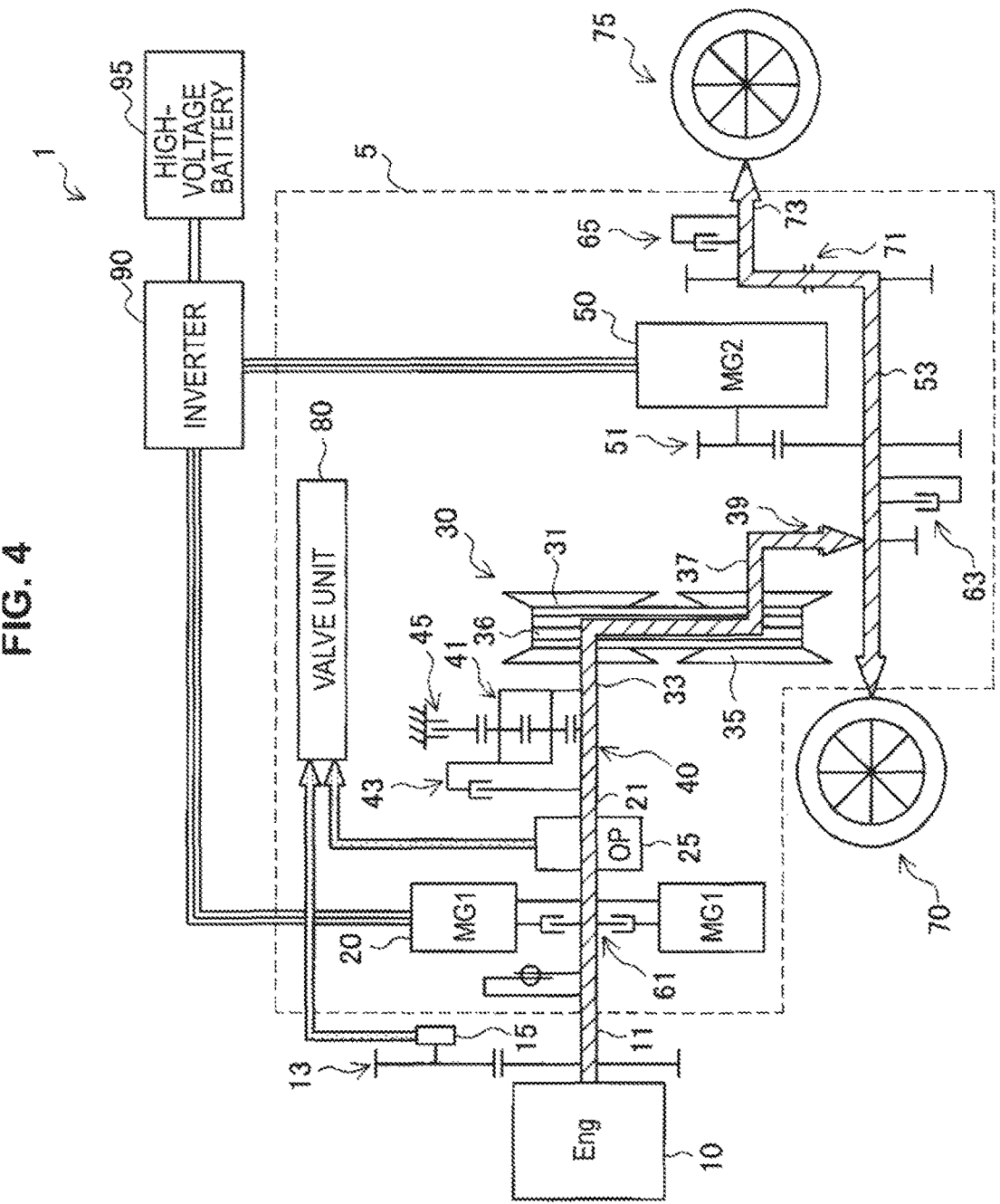
FIG. 4 is an explanatory diagram illustrating a state of a hybrid vehicle system at a time of acceleration in an engine traveling mode.

FIG. 4 illustrates a working state of the hybrid vehicle system 1 at a time of acceleration in the engine traveling mode. At the time of acceleration of the vehicle in the engine traveling mode, all the engine clutch 61, the first transmission clutch 40, and the second transmission clutch 63 are engaged, a torque output from the engine 10 is converted by the CVT 30 at a predetermined transmission gear ratio, and the torque is transmitted to the driving wheels 70 and 75. The oil pump 15 and the oil pump 25 are driven in the engine traveling mode, and oil pressure is secured in the automatic transmission 5.

During the engine traveling mode, the motor ECU 400 sets the first motor generator 20 to a zero torque state, or controls electric power generation in the first motor generator 20 by using a part of a torque output from the engine 10. The motor ECU 400 sets the second motor generator 50 to the zero torque state. When the vehicle speed slows down, the motor ECU 400 may drives at least one of the first motor generator 20 and the second motor generator 50 in a regenerative manner, and causes the first motor generator 20 and the second motor generator 50 to generate electric power by using kinetic energy of the vehicle.

When the vehicle speed slows down during traveling in the engine traveling mode, the transmission ECU 300 disengages the second transmission clutch 63, and the motor ECU 400 drives the second motor generator 50 in a regenerative manner, for example. This generates regenerative braking force. Alternatively, the motor ECU 400 may drive the first motor generator 20 in a regenerative manner while the second transmission clutch 63 is engaged. In the case where the first motor generator 20 is driven in the regenerative manner, the transmission ECU 300 may disengage the engine clutch 61. In the case where state of charge (SOC) of the high-voltage battery 95 decreases in such a state, the motor ECU 400 may control electric power generation of the first motor generator 20 by using a surplus torque output from the engine 10.

(3-2. Single Motor EV Traveling Mode)

(3-2-1. First Single Motor EV Traveling Mode)

As illustrated in FIG. 2, in the single motor EV traveling mode using the first motor generator 20 (hereinafter, also referred to as "first single motor EV traveling mode"), the transmission ECU 300 disengages the engine clutch 61 and engages the first transmission clutch 40 and the second transmission clutch 63. The motor ECU 400 causes the first motor generator 20 to perform power running driving, and transmits a torque output from the first motor generator 20 to the driving wheels 70 and 75 via the CVT 30.

Figure 5:
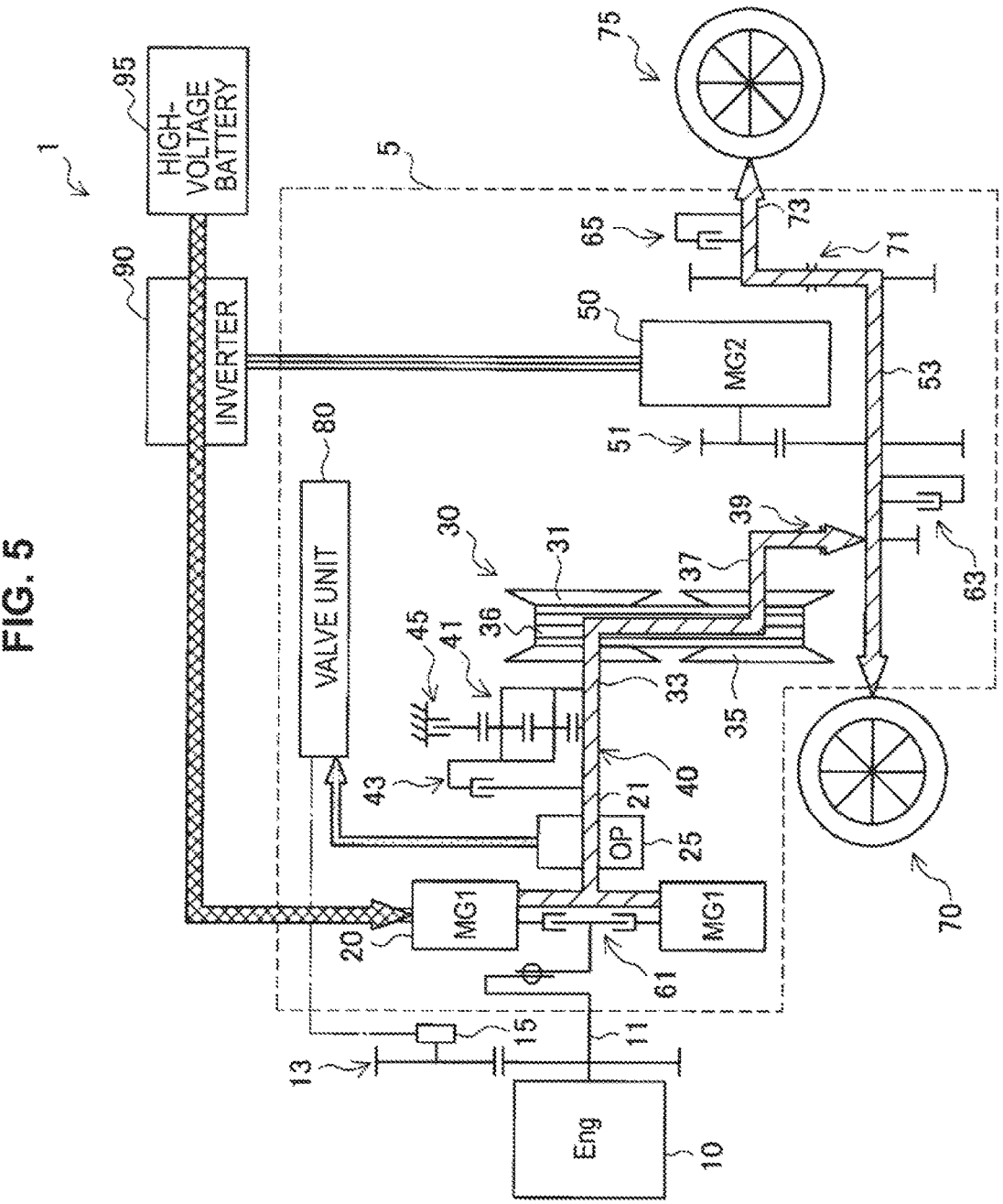
FIG. 5 is an explanatory diagram illustrating a state of a hybrid vehicle system at a time of acceleration by a first motor generator in a single motor EV traveling mode.

FIG. 5 illustrates a state of the hybrid vehicle system 1 at a time of acceleration in the first single motor EV traveling mode. At the time of acceleration of the vehicle in the first single motor EV traveling mode, the engine clutch 61 is disengaged, and the first transmission clutch 40 and the second transmission clutch 63 are engaged. Subsequently, a torque output from the first motor generator 20 is converted at a predetermined transmission gear ratio by the CVT 30, and transmitted to the driving wheels 70 and 75. In the first single motor EV traveling mode, the first motor generator 20 is driven and the oil pump 25 is driven. Therefore, oil pressure can be secured in the automatic transmission 5 even when the engine 10 is stopped and the vehicle is stopped. Accordingly, it is possible to start driving the vehicle in the first single motor EV traveling mode while the engine 10 is stopped.

When the vehicle speed slows down in the first single motor EV traveling mode, the motor ECU 400 drives the first motor generator 20 in a regenerative manner, and causes the first motor generator 20 to generate electric power by using kinetic energy of the vehicle. The motor ECU 400 sets the second motor generator 50 to the zero torque state. Alternatively, the motor ECU 400 may drive the second motor generator 20 in a regenerative manner when the vehicle speed slows down. There are the second transmission clutch 63, the CVT 30, and the first transmission clutch 40 between the first motor generator 20 and the front wheel side output shaft 53. Therefore, it is possible to improve regenerative electric power generation efficiency by prioritizing regenerative driving of the second motor generator 50.

In the case where state of charge (SOC) of the high-voltage battery 95 decreases in the first single motor EV traveling mode, the traveling mode is switched to another traveling mode so that the first motor generator 20 generates electric power by using a torque output from the engine 10.

(3-2-2. Second Single Motor EV Traveling Mode)

As illustrated in FIG. 2, in the single motor EV traveling mode using the second motor generator 50 (hereinafter, also referred to as "second single motor EV traveling mode"), the transmission ECU 300 disengages all the engine clutch 61, the first transmission clutch 40, and the second transmission clutch 63. The motor ECU 400 causes the second motor generator 50 to perform power running driving, and transmits a torque output from the second motor generator 50 to the driving wheels 70 and 75. When the vehicle speed slows down during traveling in the second single motor EV traveling mode, the second motor generator 50 is driven in a regenerative manner. This generates regenerative braking force.

Figure 6:
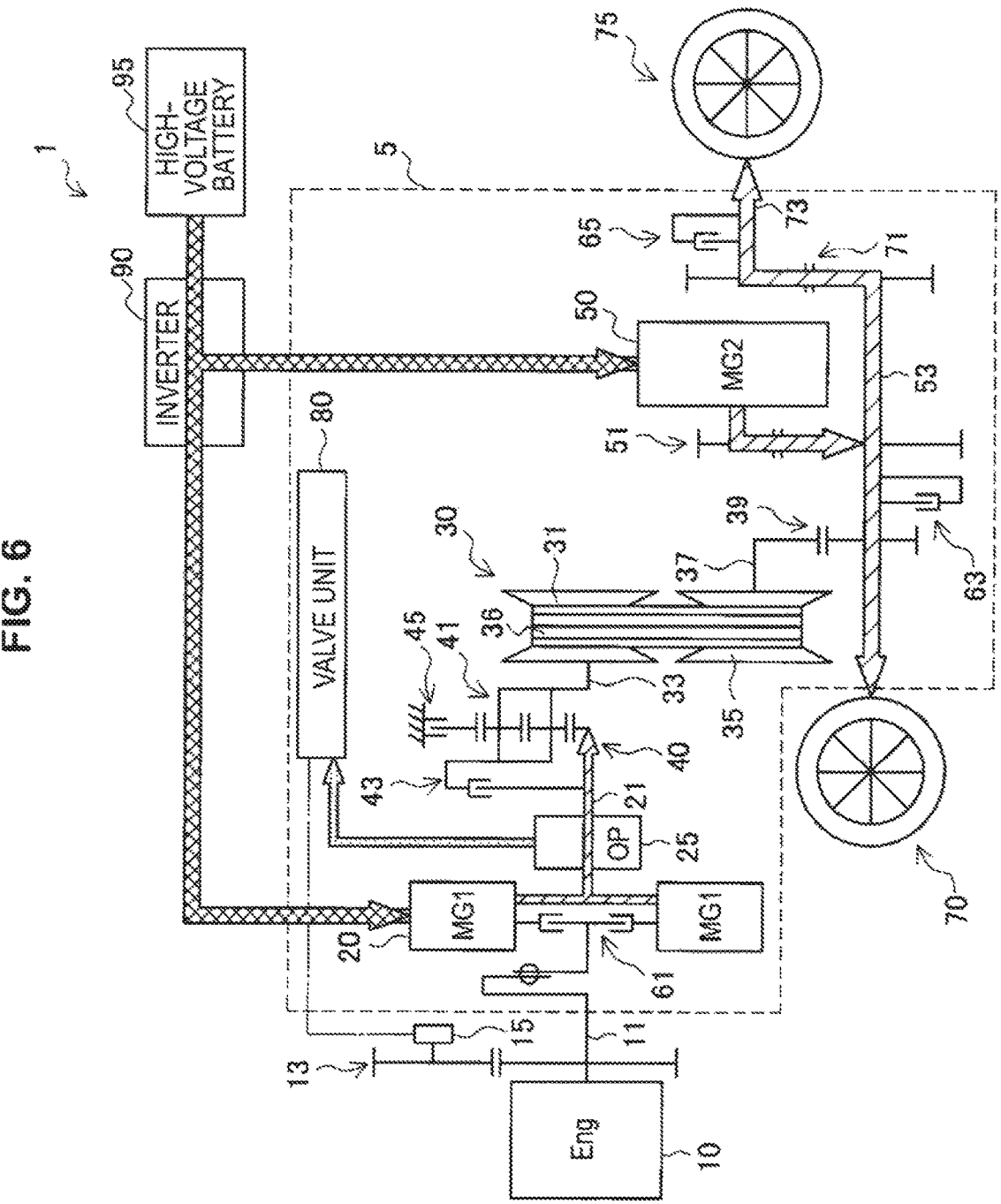
FIG. 6 is an explanatory diagram illustrating a state of a hybrid vehicle system at a time of acceleration by a second motor generator in a single motor EV traveling mode.

FIG. 6 illustrates a working state of the hybrid vehicle system 1 at a time of acceleration by the second motor generator 50 in the single motor EV traveling mode. At the time of acceleration of the vehicle in the second single motor EV traveling mode, all the engine clutch 61, the first transmission clutch 40, and the second transmission clutch 63 are disengaged, and the engine 10 and the first motor generator 20 are separated from the driving wheels 70 and 75. Therefore, driving force transmitted to the driving wheels 70 and 75 are adjusted by controlling a torque output from the second motor generator 50.

In the second single motor EV traveling mode, the motor ECU 400 drives the first motor generator 20. Thereby, the oil pump 25 is driven, and oil pressure can be secured in the automatic transmission 5 even when the engine 10 is stopped. In the second single motor EV traveling mode, the first transmission clutch 40 and the second transmission clutch 63 are disengaged. Accordingly, oil pressure can be secured in the automatic transmission 5 by driving the first motor generator 20 or the engine 10 and driving the oil pump 25 or oil pump 15 as necessary. In particular, even in the case of the second single motor EV traveling mode, it is possible to start driving the vehicle by driving the first motor generator 20 while the engine 10 is stopped.

In the case where the hybrid vehicle system 1 includes a mechanical oil pump coupled to the driving wheels 70 and 75, the oil pump is driven while the vehicle is traveling, and oil pressure can be secured in the automatic transmission 5. Accordingly, in the case where the hybrid vehicle system 1 includes such an oil pump, the motor ECU 400 may set the first motor generator 20 to a zero torque state while the vehicle is traveling in the second single motor EV traveling mode.

In the case where state of charge (SOC) of the high-voltage battery 95 decreases in the second single motor EV traveling mode, the transmission ECU 300 may engage the engine clutch 61, the engine ECU 200 may drive the engine 10, and the motor ECU 400 may control electric power generation of the first motor generator 20 by using a torque output from the engine 10. In the case where state of charge (SOC) of the high-voltage battery 95 decreases, the motor ECU 400 may control electric power generation of the first motor generator 20 by using a torque output from the engine 10. The engine ECU 200 basically stops the engine 10. However, when the first motor generator 20 controls electric power generation, the engine ECU 200 drives the engine 10. In the case where the first motor generator 20 generates electric power, the transmission ECU 300 engages the engine clutch 61.

In the hybrid vehicle system 1 according to the implementation, the engine 10, the first motor generator 20, and the CVT 30 are separated from the driving wheels 70 and 75, and the driving wheels 70 and 75 may be driven by the second motor generator 50 alone in the second single motor EV traveling mode. In this case, a torque output from the second motor generator 50 does not pass through the CVT 30 when the torque is transmitted to the driving wheels 70 and 75. Therefore, a torque for securing oil pressure in the automatic transmission 5 decreases, and this results in good fuel economy.

(3-3. Twin Motor EV Traveling Mode)

As illustrated in FIG. 2, in the twin motor EV traveling mode, the transmission ECU 300 disengages the engine clutch 61 and engages the first transmission clutch 40 and the second transmission clutch 63. The motor ECU 400 causes each of the first motor generator 20 and the second motor generator 50 to perform power running driving while adjusting outputs from the first motor generator 20 and the second motor generator 50. Subsequently, the transmission ECU 300 converts a torque output from the first motor generator 20 at a predetermined transmission gear ratio in the CVT 30, transmits the torque to the front wheel side output shaft 53, combines the torque output from the first motor generator 20 with a torque output from the second motor generator 50, and transmits the combined torque to the driving wheels 70 and 75.

Figure 7:
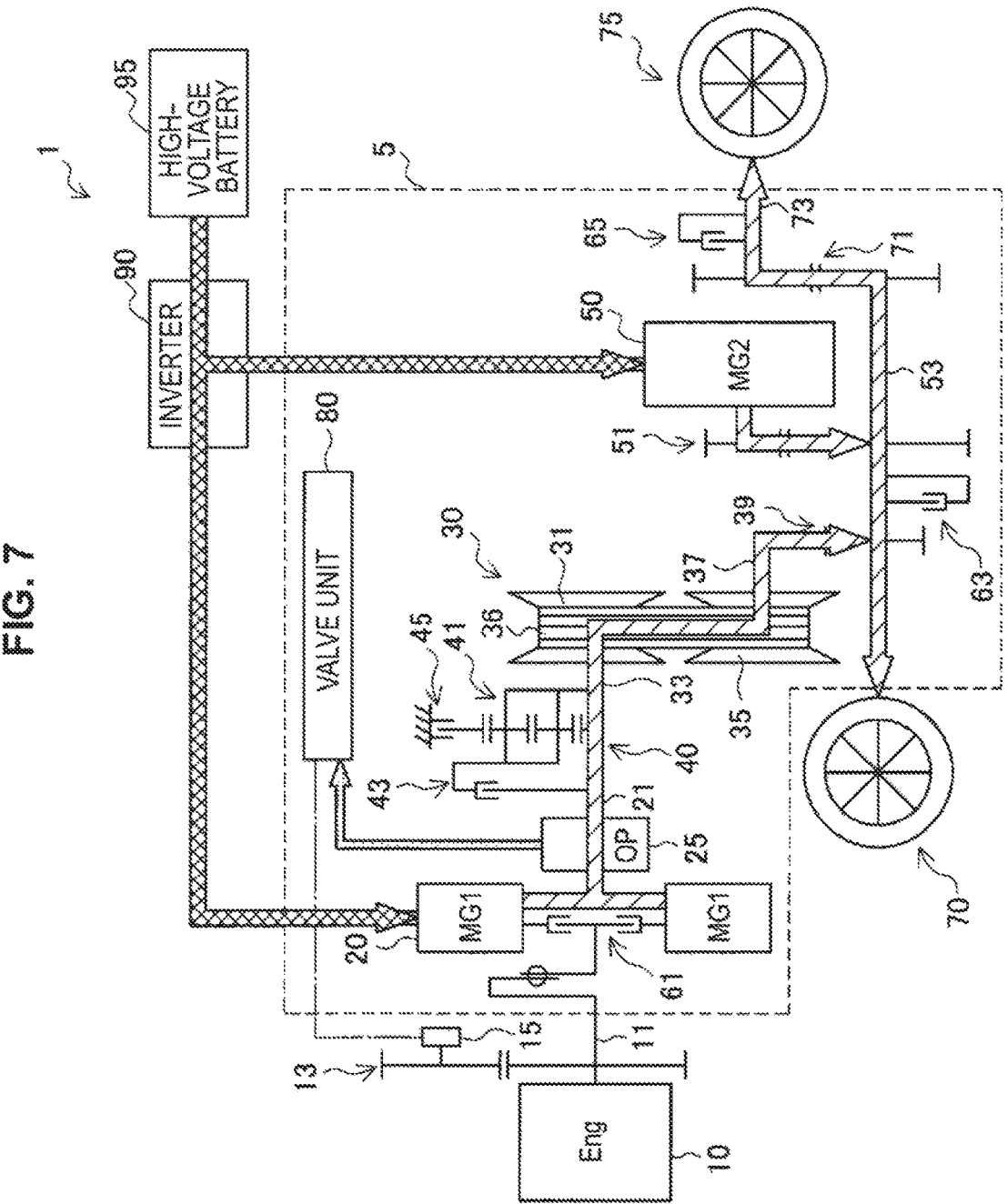
FIG. 7 is an explanatory diagram illustrating a state of a hybrid vehicle system at a time of acceleration in a twin motor EV traveling mode.

FIG. 7 illustrates a working state of the hybrid vehicle system 1 at a time of acceleration in the twin motor EV traveling mode. At the time of acceleration of the vehicle in the twin motor EV traveling mode, the engine clutch 61 is disengaged, and the first transmission clutch 40 and the second transmission clutch 63 are engaged. Therefore, driving force to be transmitted to the driving wheels 70 and 75 are adjusted by controlling torques output from the first motor generator 20 and the second motor generator 50.

When the vehicle speed slows down in the twin motor EV traveling mode, the motor ECU 400 drives at last one of the first motor generator 20 and the second motor generator 50 in a regenerative manner, and causes at last one of the first motor generator 20 and the second motor generator 50 to generate electric power by using kinetic energy of the vehicle. In the case of the twin motor EV traveling mode, the engine clutch 61 is always disengaged, and the engine 10 is stopped. In the twin motor EV traveling mode, the first motor generator 20 is driven and the oil pump 25 is driven. Therefore, oil pressure can be secured in the automatic transmission 5 even when the engine 10 is stopped.

In the case where state of charge (SOC) of the high-voltage battery 95 decreases in the twin motor EV traveling mode, the traveling mode is switched to another traveling mode so that the first motor generator 20 generates electric power by using a torque output from the engine 10.

(3-4. Hybrid Traveling Mode)

As illustrated in FIG. 2, in the hybrid traveling mode, the transmission ECU 300 engages all the engine clutch 61, the first transmission clutch 40, and the second transmission clutch 63. The engine ECU 200 drives the engine 10, and transmits driving force to the driving wheels 70 and 75. The motor ECU 400 causes at last one of the first motor generator 20 and the second motor generator 50 to perform power running driving, and supports driving of the driving wheels 70 and 75, for example. In this case, the transmission ECU 300 converts a torque transmitted to the CVT 30 at a predetermined transmission gear ratio, transmits the torque to the front wheel side output shaft 53, combines the torque transmitted to the CVT 30 with a torque output from the second motor generator 50, and transmits the combined torque to the driving wheels 70 and 75.

Figure 8:
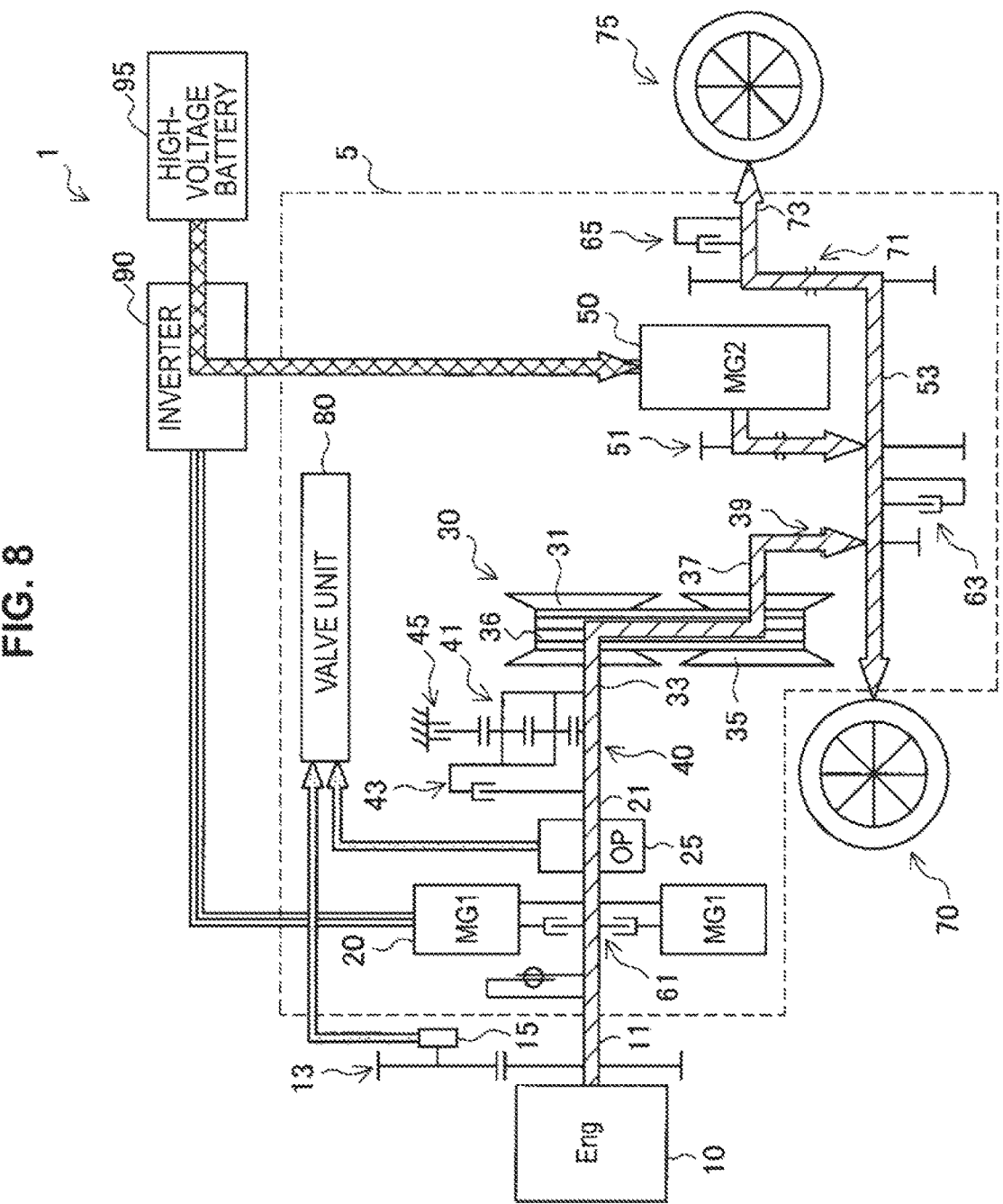
FIG. 8 is an explanatory diagram illustrating a state of a hybrid vehicle system at a time of acceleration in a hybrid traveling mode.

FIG. 8 illustrates a working state of the hybrid vehicle system 1 at a time of acceleration in the hybrid traveling mode. At the time of acceleration of the vehicle in the hybrid traveling mode, all the engine clutch 61, the first transmission clutch 40, and the second transmission clutch 63 are engaged. Accordingly, a torque output from at least one of the first motor generator 20 and the second motor generator 50 is complemented with a torque output from the engine 10, and driving force to be transmitted to the driving wheels 70 and 75 is adjusted.

When the vehicle speed slows down in the hybrid traveling mode, the motor ECU 400 drives at last one of the first motor generator 20 and the second motor generator 50 in a regenerative manner, and causes at last one of the first motor generator 20 and the second motor generator 50 to generate electric power by using kinetic energy of the vehicle. In the case where state of charge (SOC) of the high-voltage battery 95 decreases in the hybrid traveling mode, the motor ECU 400 may control electric power generation of the first motor generator 20 by using a surplus torque output from the engine 10. At least the engine 10 is driven and the oil pump 15 and the oil pump 25 are driven in the hybrid traveling mode. Therefore, oil pressure is secured in the automatic transmission 5.

(3-5. Time when Engine Starts)

The hybrid vehicle system 1 according to the implementation does not include a starter motor that provides a torque to the crankshaft 11 when the engine 10 starts or stops. In this hybrid vehicle system 1, control at the time when the engine 10 starts or stops is performed by using the first motor generator 20.

Figure 9:
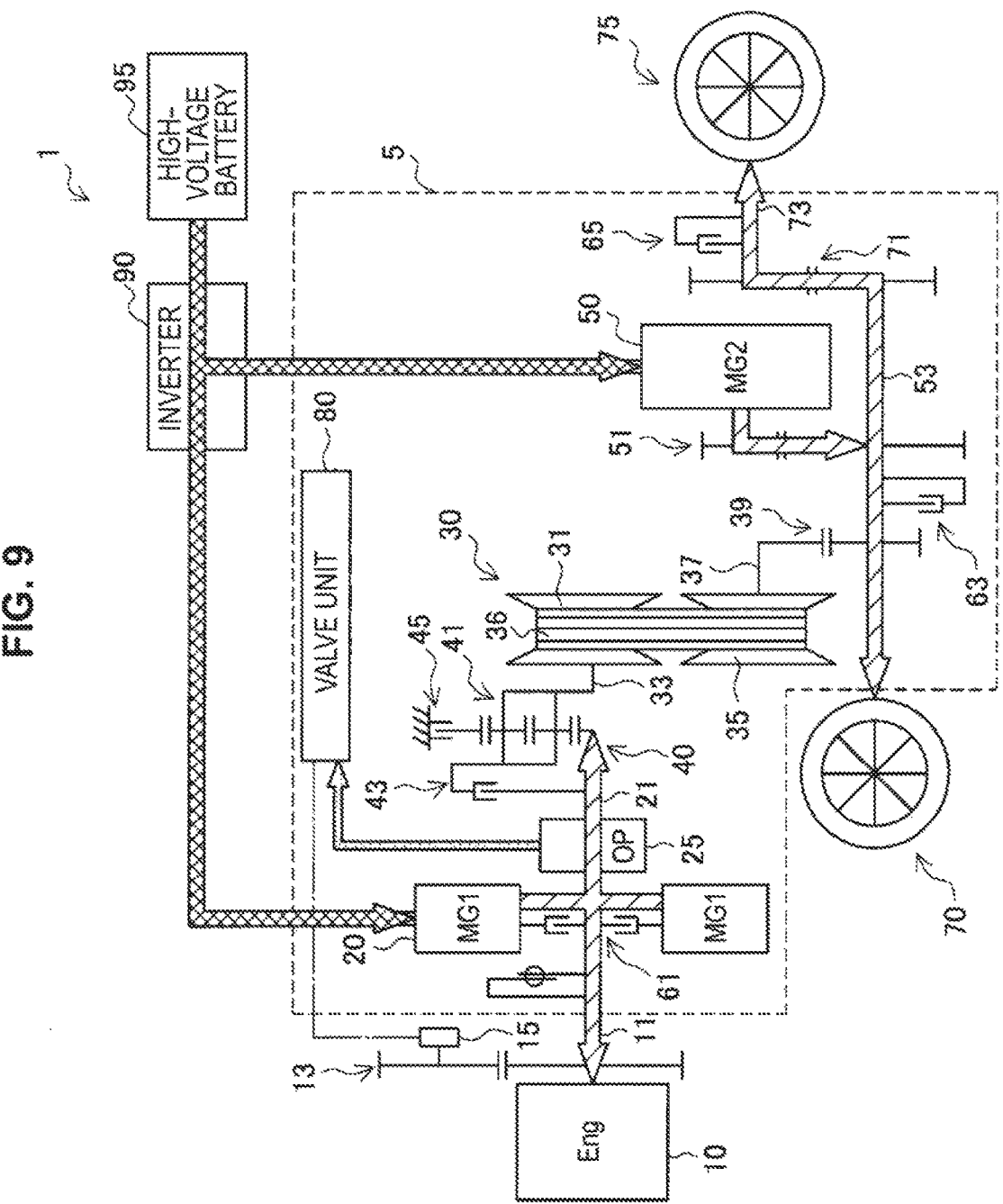
FIG. 9 is an explanatory diagram illustrating a state of a hybrid vehicle system at a time of starting an engine in a motor traveling mode and switching to a hybrid traveling mode.

FIG. 9 illustrates a working state of the hybrid vehicle system 1 at a time when the engine 10 starts. FIG. 9 illustrates a state in which the engine 10 starts when the traveling mode is switched from the single motor EV traveling mode or the twin motor EV traveling mode to the hybrid traveling mode. To start the engine 10, the first transmission clutch 40 and the second transmission clutch 63 are disengaged, and the engine clutch 61 is engaged. By driving the first motor generator 20 in such a state, the engine 10 is cranked, and it is possible to start the engine 10.

When the motor traveling mode is switched to the hybrid traveling mode, oil pressure is secured in the automatic transmission 5. Therefore, it is possible to switch engagement and disengagement of the engine clutch 61, the first transmission clutch 40, and the second transmission clutch 63.

The hybrid vehicle system 1 is in a state similar to FIG. 9 even in the case where the engine 10 stops when the hybrid traveling mode is switched to the single motor EV traveling mode or the twin motor EV traveling mode. By performing control in a manner that an output torque from the first motor generator 20 becomes a predetermined value, it is possible to stop the engine 10 while controlling revolution speed of the engine 10. Thereby, it is possible to reduce vibration and noise at the time when the engine 10 stops.

<4. Timing Chart>

Next, change in usage states of the engine 10, the first motor generator 20, the second motor generator 50, the engine clutch 61, the first transmission clutch 40, and the second transmission clutch 63 at the time when a vehicle equipped with the hybrid vehicle system 1 according to the implementation is traveling will be described. Hereinafter, first, a timing chart illustrating a usage state of a system according to a reference example that is different from the hybrid vehicle system 1 according to the implementation will be described, and then a timing chart illustrating a usage state of the hybrid vehicle system 1 according to the implementation will be described.

Figure 10:
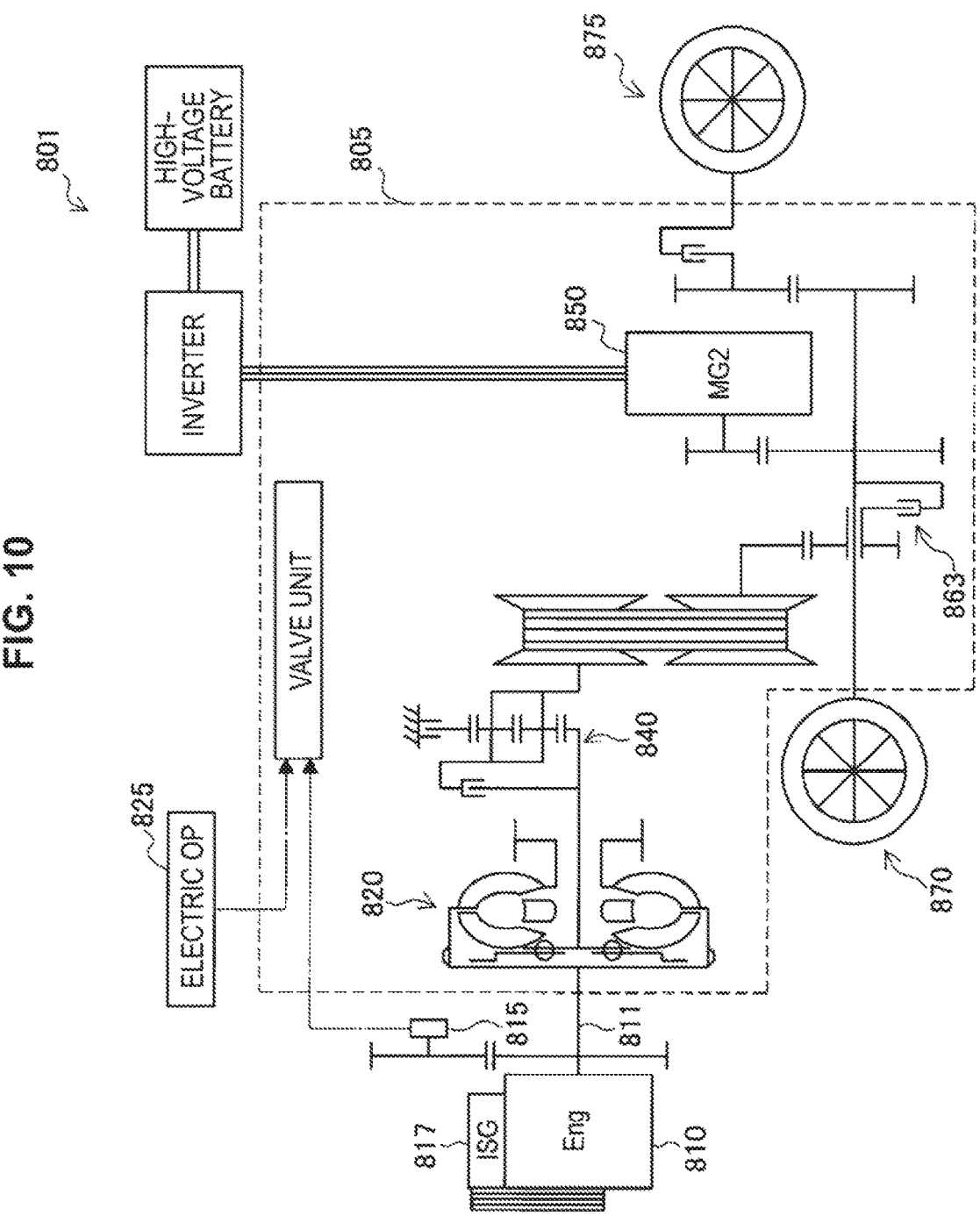
FIG. 10 is an explanatory diagram illustrating a hybrid vehicle system according to a reference example.

FIG. 10 is a schematic diagram illustrating a hybrid vehicle system 801 according to the reference example. The hybrid vehicle system 801 according to the reference example does not include a motor generator corresponding to the first motor generator 20 or an oil pump corresponding to the oil pump 25 that may be driven by the first motor generator 20. Instead of such structural elements, a starter generator 817 is provided on an engine 810, and an electric oil pump 825 is provided for securing oil pressure in an automatic transmission 805 when the engine 810 stops. In addition, the hybrid vehicle system 801 according to the reference example includes a torque converter 820 instead of an engine clutch 61. Power may be always transmitted to an input side of a first transmission clutch 840 when the engine 810 is driven.

Figure 11:
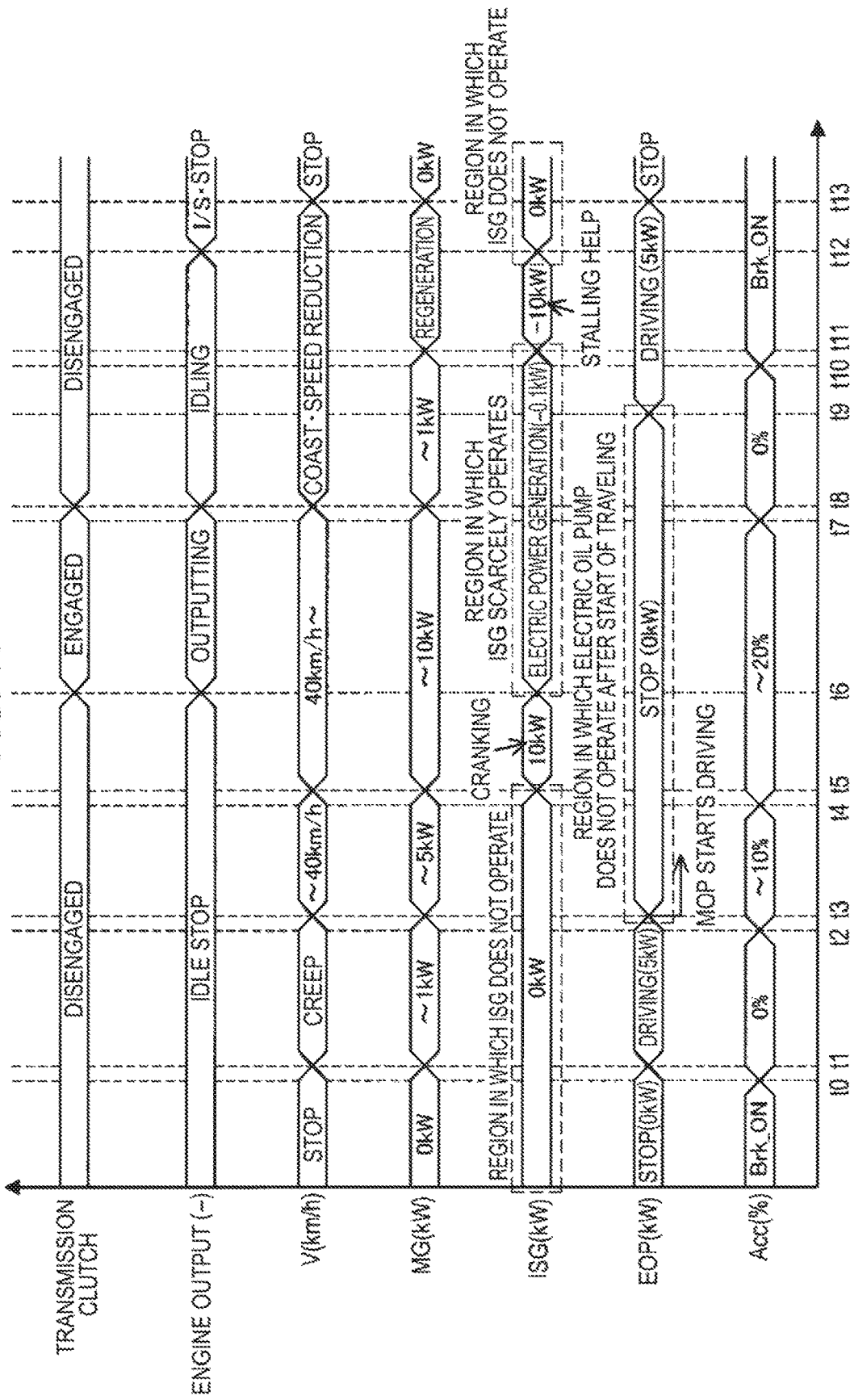
FIG. 11 is a timing chart illustrating a working state of a hybrid vehicle system according to a reference example.

FIG. 11 is a timing chart illustrating change in an accelerator opening degree Acc, an output of the electric oil pump 825 (EOP), an output of the starter generator 817 (ISG), an output of a motor generator 850 (MG), a vehicle speed (V), an output of the engine 810, and states of transmission clutches (first transmission clutch 840 and second transmission clutch 863). In the hybrid vehicle system 1 according to the reference example, the oil pump 815 is driven by revolution of the engine 810 and rotation of driving wheels 870 and 875, and an oil pressure is generated in the automatic transmission 805.

First, when the accelerator opening degree Acc is zero and the vehicle speed V is zero in a state where a brake is on (until time t0), the transmission clutch 840 is disengaged, and all the electric oil pump 825, the starter generator 817, the motor generator 850, and the engine 810 are stopped. In this state, no oil pressure is generated in the automatic transmission 805.

When the brake is turned off at the time t0, the electric oil pump 825 and the motor generator 580 start driving at time t1. By driving the electric oil pump 825, oil pressure is generated in the automatic transmission 805 even in the state where the engine 810 is stopped. To secure the oil pressure in the automatic transmission 805, continuous rated output of 5 kW is necessary for the electric oil pump 825, for example. Even when the brake is turned off, output from the motor generator 850 is small and the vehicle enters a creep state because the accelerator opening degree is 0% until time t2.

Next, when the accelerator opening degree Acc starts increasing at the time t2, output from the motor generator 850 start increasing at time t3, and the vehicle speed V starts increasing. At the time t3, the electric oil pump 825 stops because the vehicle starts traveling, the oil pump 815 is driven by rotation of the driving wheels 870 and 875, and oil pressure is generated.

Next, the accelerator opening degree Acc further increases at time t4. For example, when the accelerator opening degree Acc exceeds 10%, the output from the motor generator 850 further increases at time t5, the starter generator 817 starts operation, and cranking of the engine 810 starts. In this case, a relatively large output of 10 kW is necessary as the output from the starter generator 817.

Subsequently, when the start-up of the engine 810 is completed at time t6, the cranking by the starter generator 817 is finished, the transmission clutch 840 is engaged, and transmission of a torque output from the engine 810 to the driving wheels 870 and 875 is started. Thereby, the driving wheels 870 and 875 are driven while the output from the engine 810 is complemented with the output from the motor generator 850. After the start-up of the engine 810 is completed, the starter generator 817 is switched to an electric power generation mode. The output from the starter generator 817 is substantially −0.1 kW during the electric power generation mode. This means that only little of rated output from the starter generator 817 is used.

Next, when the accelerator opening degree Acc is changed back to 0% at time t7, the transmission clutch 840 is disengaged at time t8, the engine 810 enters an idling state, and the output from the motor generator 850 gradually decreases. Thereby, the vehicle enters a coast state, and gradually slows down. Subsequently, at time t9, the electric oil pump 825 is driven again to complement reduction in oil pressure in the automatic transmission 805 due to reduction in the vehicle speed V.

Next, when the brake is turned on at time t10, the motor generator 850 is driven in a regenerative manner at time t11, and this generates regenerative braking force of the vehicle. The starter generator 817 provides the braking force to the crankshaft 811, and stops the engine 810 while controlling the revolution speed of the engine 810. Subsequently, when the engine 810 stops at time t12, the starter generator 817 also stops driving. Subsequently, when the vehicle stops at time t13, the electric oil pump 825 and the motor generator 850 also stop driving.

As illustrated in FIG. 11, the electric oil pump 825 is used only in a limited period while the vehicle is traveling. However, continuous rated output of substantially 4 to 5 kW is necessary for the electric oil pump 825. This result in poor fuel economy due to increase in cost and mass. Although a relatively large output (for example, 10 kW) is necessary for the starter generator 817 when the engine 810 starts or stops, the starter generator 817 scarcely operates in a period other than the start and stop of the engine 810. Accordingly, the starter generator 817 is one of the causes of poor fuel economy due to increase in cost and mass.

Figure 12:
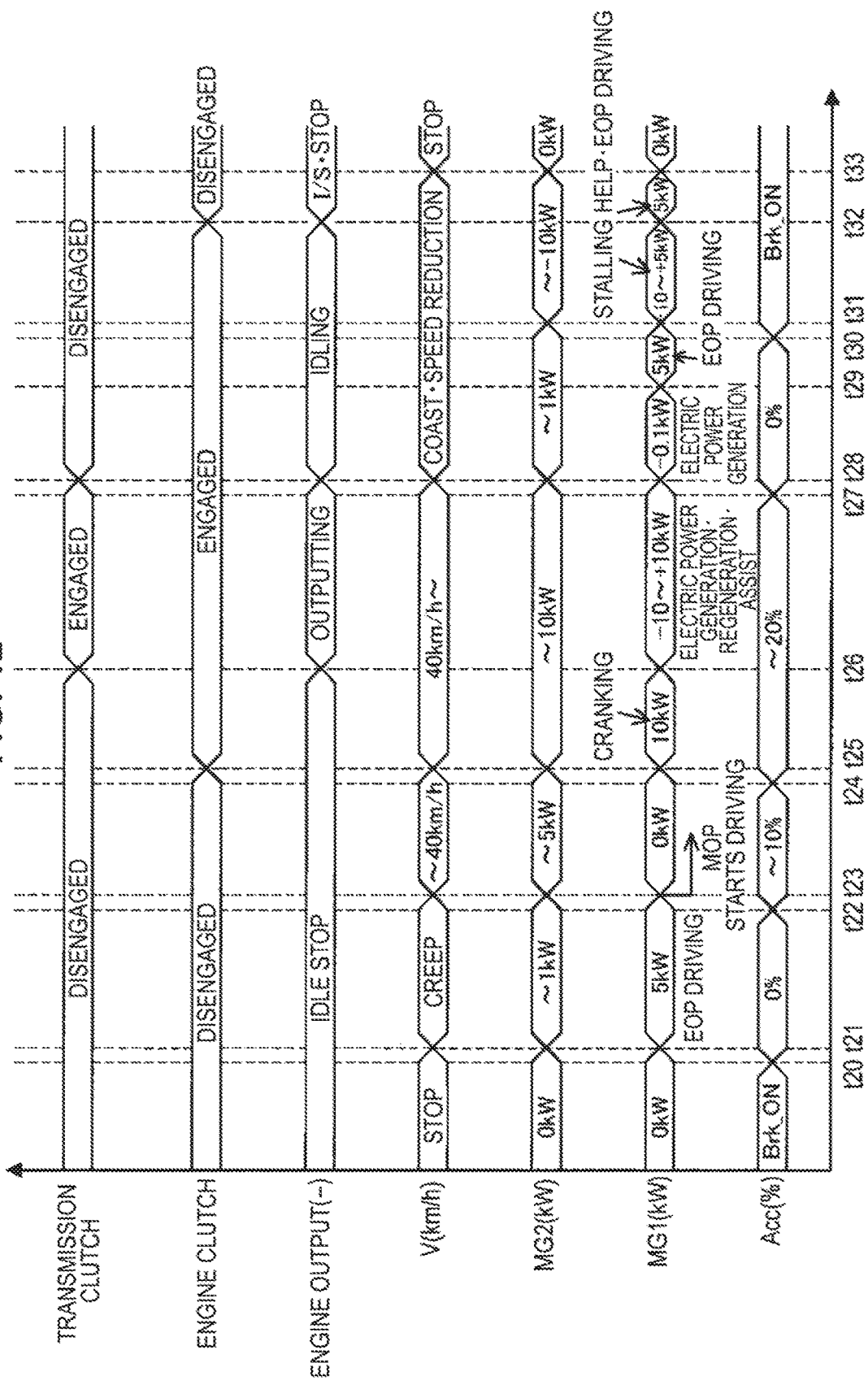
FIG. 12 is a timing chart illustrating a working state of a hybrid vehicle system according to the implementation.

On the other hand, FIG. 12 is a timing chart illustrating change in an accelerator opening degree Acc, an output of the first motor generator 20 (MG1), an output of the second motor generator 50 (MG2) a vehicle speed (V), an output of the engine 10, a state of the engine clutch, and states of transmission clutches (first transmission clutch 40 and second transmission clutch 63). In the example illustrated in FIG. 12, although the oil pump 15 is driven by the output torque from the engine 10, the oil pump 15 is also driven by rotation of the driving wheels 70 and 75, and oil pressure is generated in the automatic transmission 5.

First, when the accelerator opening degree Acc is zero and the vehicle speed V is zero in a state where a brake is on (until time t20), all the engine clutch 61, the first transmission clutch 40, and the second transmission clutch 63 are disengaged, and all the first motor generator 20, the second motor generator 50, and the engine 10 are stopped. In this state, no oil pressure is generated in the automatic transmission 5.

When the brake is turned off at the time t20, the first motor generator 20 and the second motor generator 50 start driving at time t21. By driving the first motor generator 20, the oil pump 25 is driven, and oil pressure is generated in the automatic transmission 5 even in the state where the engine 10 is stopped. Since the engine clutch 61 and the first transmission clutch 40 are disengaged, the first motor generator 20 is used only for driving the oil pump 25. For example, the first motor generator 50 is driven by an output of 5 kW. Even when the brake is turned off, output from the second motor generator 50 is small and the vehicle enters a creep state because the accelerator opening degree is 0% until time t22.

When the accelerator opening degree Acc starts increasing at the time t22, output from the second motor generator 50 starts increasing at time t23, and the vehicle speed V starts increasing. At the time t23, the first motor generator 20 stops because the vehicle starts traveling, the oil pump 15 coupled to the front wheel side output shaft 53 is driven with rotation of the driving wheel (front wheel) 70, and oil pressure is generated.

Next, the accelerator opening degree Acc further increases at time t24. For example, when the accelerator opening degree Acc exceeds 10%, the output from the second motor generator 50 further increases at time t25. After time t25, the engine clutch 61 is engaged, the first motor generator 20 starts operating, and cranking of the engine 10 starts. In this case, the output from the first motor generator 20 is 10 kW.

Subsequently, when the start-up of engine 10 is completed at time t26, the cranking by the first motor generator 20 is finished, the first transmission clutch 40 and the second transmission clutch 63 are engaged, and transmission of a torque output from the engine 10 to the driving wheels 70 and 75 is started. Thereby, the driving wheels 70 and 75 are driven while the output from the engine 10 is complemented with the output from the second motor generator 50. After time t26, the first motor generator 20 is controlled while being switched to power running driving (assist), regenerative driving, or electric power generation control. For example, an output from the first motor generator 20 is controlled to be between −10 kW and +10 kW.

Next, when the accelerator opening degree Acc is changed back to 0% at time t27, the first transmission clutch 40 and the second transmission clutch 63 are disengaged at time t28, the engine 10 enters an idling state, and the output from the second motor generator 50 gradually decreases. Thereby, the vehicle enters a coast state, and gradually slows down. Since the first transmission clutch 40 is disengaged at the time t28, the first motor generator 20 controls electric power generation by using the output torque from the engine 10. Subsequently, with the decrease in the vehicle speed V, rotation speed of the oil pump 15 that is driven by rotation of the driving wheels 70 and 75 decreases. Therefore, the first motor generator 20 starts driving again at time t29, and the oil pump 25 is driven. Thereby, an oil pump for generating oil pressure in the automatic transmission 5 is switched from the mechanical oil pump 15 to the oil pump 25 driven by the first motor generator 20.

Next, when the brake is turned on at time t30, the second motor generator 50 is driven in a regenerative manner at time t31, and this generates regenerative braking force of the vehicle. The first motor generator 20 provides the braking force to the crankshaft 11, and stops the engine 10 while controlling the revolution speed of the engine 10. Subsequently, when the engine 10 stops at time t32, the engine clutch 61 is disengaged and the first motor generator 20 is driven as a driving motor of the oil pump 25. Subsequently, when the vehicle stops at time t33, the first motor generator 20 and the second motor generator 50 also stop driving.

In the hybrid vehicle system 1 according to the implementation, the first motor generator 20 is also used as a starter generator of the engine 10 and a driving motor of the electric oil pump 25. Therefore, the first motor generator 20 is effectively used in various scenes while the vehicle is traveling, and it is possible to omit the starter generator and the dedicated electric oil pump from the hybrid vehicle system 1. This enables cost reduction of the hybrid vehicle system 1.

As described above, in the hybrid vehicle system 1 according to the implementation, the first motor generator 20 also functions as the starter generator of the engine 10. Therefore, it is possible to omit the conventional starter generator that is used only when the engine 10 starts or stops. In addition, the first motor generator 20 integrated with the oil pump 25 also functions as the electric oil pump. Therefore, it is possible to secure oil pressure in the automatic transmission 5 even in the state where the engine 10 or the driving wheels 70 and 75 are stopped, and it is possible to omit the conventional electric oil pump that is used only when the mechanical oil pump 15 cannot generate oil pressure of a working fluid.

In the hybrid vehicle system 1 according to the implementation, the first motor generator 20 is provided in a coupled manner to the primary pulley 31 of the CVT 30 via the first transmission clutch 40. This enables the first motor generator 20 to function as the driving motor or a regenerative electric power generator during traveling. Therefore, it is possible to improve engine performance of the vehicle. In addition, the first motor generator 20 can function as an electric power generator in the case where the output from the engine 10 includes a surplus torque while the engine 10 generates driving force of the vehicle. Therefore, it is possible to improve fuel economy performance of the vehicle. As described above, in the hybrid vehicle system 1, the first motor generator 20 has functions of a starter generator, an electric oil pump, a driving motor, and an electric power generator. This enables system cost reduction.

In addition, in the hybrid vehicle system 1 according to the implementation, the second motor generator 50 is driven in a regenerative manner when the vehicle slows down in any traveling mode. Thereby, it is possible to generate regenerative braking force while generating regenerative electric power. In addition, by driving the first motor generator 20 in a regenerative manner when the vehicle slows down in the engine traveling mode, the twin motor EV traveling mode, or the hybrid traveling mode, it is possible to generate regenerative braking force while generating regenerative electric power. In addition, in the single motor EV traveling mode or the hybrid traveling mode, the first motor generator 20 can generate electric power by using a part or all of a torque output from the engine 10. In addition, in the engine traveling mode, the first motor generator 20 can generate electric power by using a part of a torque output from the engine 10. Therefore, it is possible to perform regenerative electric power generation in any traveling mode by appropriately selecting the first motor generator 20 or the second motor generator 50, and it is possible to improve fuel economy performance.

Although the preferred implementation of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

Figure 13:
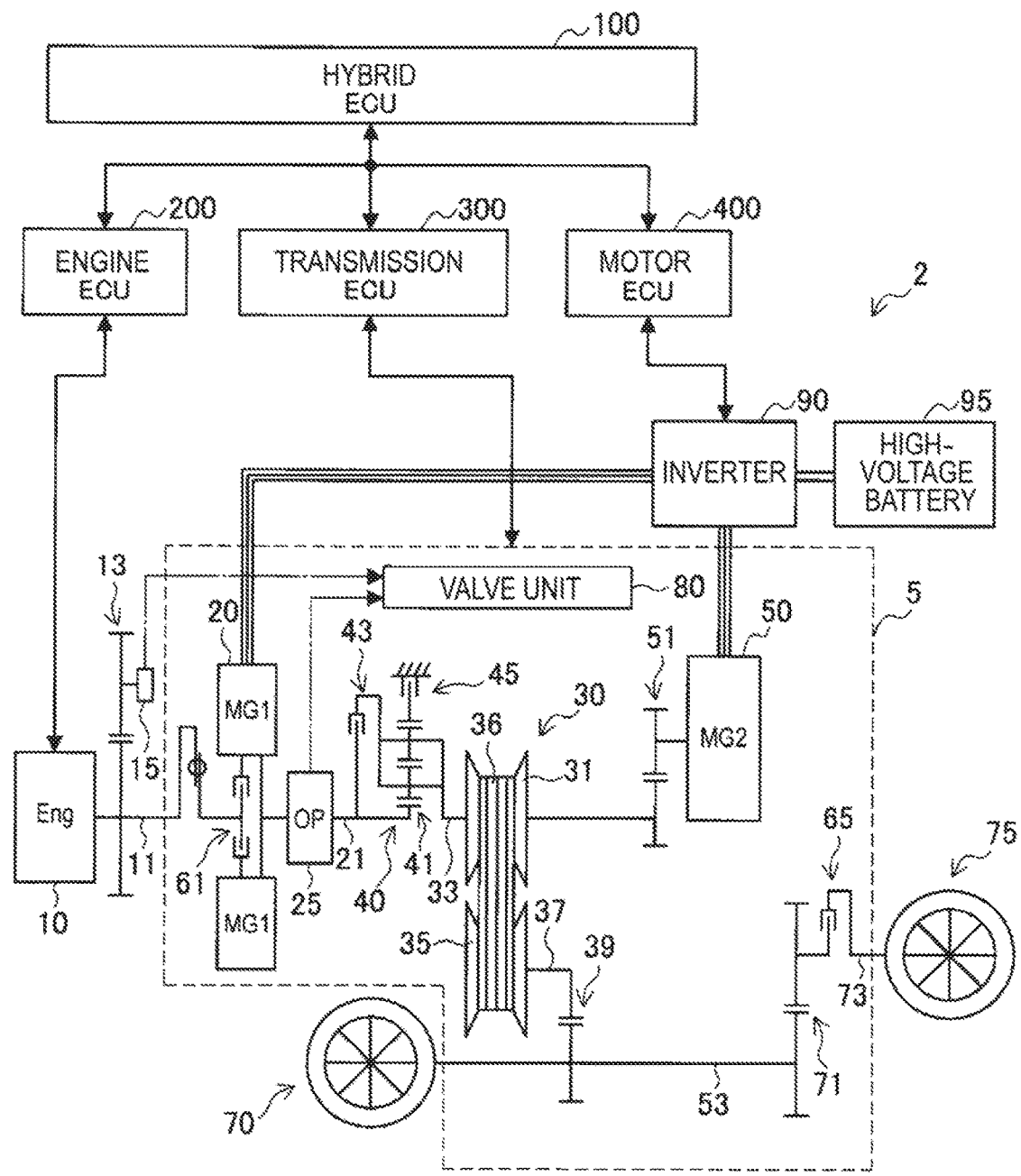
FIG. 13 is a schematic diagram illustrating a configuration example of a hybrid vehicle system according to a modification.

Although the second motor generator 50 is disposed at an output side of the CVT 30 according to the above described implementation, the configuration of the hybrid vehicle system to which the present invention is applicable is not limited thereto. FIG. 13 illustrates a configuration example of a hybrid vehicle system 2 in which the second motor generator 50 is disposed at an input side of the CVT 30. In the hybrid vehicle system 2, the second motor generator 50 is disposed in parallel to the engine 10 and a power transmission path of the first motor generator 20. In the hybrid vehicle system 2 illustrated in FIG. 13, a transmission clutch corresponding to the second transmission clutch (output side transmission clutch) 63 according to the above described implementation is omitted.

Even in the hybrid vehicle system 2, it is possible to obtain effect similar to the hybrid vehicle system 1 according to the above described implementation by disengaging or engaging the first transmission clutch 40 in accordance with disengagement and engagement of the first transmission clutch 40 according to the above described implementation. In the hybrid vehicle system 2 illustrated in FIG. 13, a torque output from the second motor generator 50 is transmitted to the driving wheels 70 and 75 via the CVT 30. Thereby, it is possible to convert the torque output from the second motor generator 50 at a desired transmission gear ratio by the CVT 30 and transmit the converted torque. Therefore, the system focusing more on torque performance can be obtained.

According to the above described implementation, the engine clutch 61 is disposed between the engine 10 and the first motor generator 20. However, a torque converter may be disposed instead of the engine clutch 61, or the engine 10 may be directly coupled to the first motor generator 20. In this case, although the engine 10 rotates together when driving the first motor generator 20 or when driving the first motor generator 20 in a regenerative manner, it is possible to use the first motor generator 20 as a starter generator, an electric oil pump, a driving motor, and an electric power generator in a way similar to the hybrid vehicle system 1 according to the above described implementation. Therefore, it is possible to reduce system cost.

In the above described implementation, the hybrid vehicle system 1 does not include a starter motor. However, the present invention is not limited thereto. The hybrid vehicle system may include the starter motor. In this case, for example, the starter motor is used for driving the engine 10 when the first motor generator 20 malfunctions.

The invention claimed is:

1. A hybrid vehicle system comprising:
an engine that is capable of outputting a torque to be transmitted to a driving wheel;
a first motor generator that is provided in a coupled manner to the engine and that is capable of outputting a torque to be transmitted to the driving wheel;
a transmission that converts a torque output from one or both of the engine and the first motor generator at a predetermined transmission gear ratio;
a first transmission clutch that is capable of switching on and off a first power transmission between the first motor generator and the transmission;
a second transmission clutch that is capable of switching on and off a second power transmission between the transmission and the driving wheel;
a second motor generator that is capable of outputting a torque to be transmitted to the driving wheel in a state in which the first transmission clutch is disengaged; and
an oil pump that is coupled to a motor shaft of the first motor generator and that is driven by rotation of the motor shaft.

2. The hybrid vehicle system according to claim 1, comprising an engine clutch that is capable of switching on and off a third power transmission between the engine and the first motor generator.

3. The hybrid vehicle system according to claim 2, wherein the engine clutch is provided in the first motor generator.

4. The hybrid vehicle system according to claim 2, wherein the second motor generator is coupled to an input side of the transmission.

5. The hybrid vehicle system according to claim 2, wherein the second motor generator is coupled to an output side of the transmission.

6. The hybrid vehicle system according to claim 5, comprising an output side transmission clutch that is capable of switching on and off a fourth power transmission, between the transmission and the second motor generator.

7. The hybrid vehicle system according to claim 2, comprising a second oil pump that is coupled to a crankshaft of the engine and that is driven by an output torque from the engine, while the oil pump is a first oil pump.

8. The hybrid vehicle system according to claim 2, comprising a control device that controls the hybrid vehicle system, wherein the control device is capable of executing
a hybrid traveling mode in which the driving wheel is driven by the torque output from the engine and one or both of the torque output from the first motor generator and the torque output from the second motor generator, and
a motor traveling mode in which the driving wheel is driven by one or both of the torque output from at the first motor generator and the torque output from the second motor generator.

9. The hybrid vehicle system according to claim 8,
wherein the control device disengages the first transmission clutch and drives the oil pump by an output torque from the first motor generator while executing a single motor electric vehicle traveling mode in which the driving wheel is driven by only the torque output from the second motor generator.

10. The hybrid vehicle system according to claim 8, wherein, when starting the engine, the control device cranks the engine by using an output torque from the first motor generator in the state in which the first transmission clutch is disengaged, and starts the engine.

11. The hybrid vehicle system according to claim 8, wherein the control device disengages the engine clutch that is capable of switching on and off the third power transmission between the engine and the first motor generator, while executing a twin motor electric vehicle traveling mode in which the driving wheel is driven by the torque output from the first motor generator and the torque output from the second motor generator.

12. The hybrid vehicle system according to claim 1, wherein the second motor generator is coupled to an input side of the transmission.

13. The hybrid vehicle system according to claim 1, wherein the second motor generator is coupled to an output side of the transmission.

14. The hybrid vehicle system according to claim 13, comprising an output side transmission clutch that is capable of switching on and off a fourth power transmission, between the transmission and the second motor generator.

15. The hybrid vehicle system according to claim 1, comprising a second oil pump that is coupled to a crankshaft of the engine and that is driven by an output torque from the engine, while the oil pump is a first oil pump.

16. The hybrid vehicle system according to claim 1, comprising a control device that controls the hybrid vehicle system, wherein the control device is capable of executing
a hybrid traveling mode in which the driving wheel is driven by the torque output from the engine and one or both of the torque output from the first motor generator and the torque output from the second motor generator, and
a motor traveling mode in which the driving wheel is driven by one or both of the torque output from at the first motor generator and the torque output from the second motor generator.

17. The hybrid vehicle system according to claim 16, wherein the control device disengages the first transmission clutch and drives the oil pump by an output torque from the first motor generator while executing a single motor electric vehicle traveling mode in which the driving wheel is driven by only the torque output from the second motor generator.

18. The hybrid vehicle system according to claim 16, wherein, when starting the engine, the control device cranks the engine by using an output torque from the first motor generator in the state in which the first transmission clutch is disengaged, and starts the engine.

19. The hybrid vehicle system according to claim 16, wherein the control device disengages an engine clutch that is capable of switching on and off a third power transmission between the engine and the first motor generator, while executing a twin motor electric vehicle traveling mode in which the driving wheel is driven by the torque output from the first motor generator and the torque output from the second motor generator.

* * * * *